FIP8102 OR 3,899,738

United States Patent

Harzer

[11] 3,899,738

[45] Aug. 12, 1975

[54] SYSTEM FOR MEASURING GROUP DELAY AND/OR ATTENUATION IN CLOSED SIGNAL-TRANSMISSION LOOP

[75] Inventor: Peter Harzer, Eningen, Germany

[73] Assignee: Wandel u. Goltermann, Reutlingen, Germany

[22] Filed: Aug. 8, 1974

[21] Appl. No.: 495,848

Related U.S. Application Data

[63] Continuation of Ser. No. 355,492, April 30, 1973, abandoned.

[30] Foreign Application Priority Data

Apr. 29, 1972 Germany ............................ 2221256

[52] U.S. Cl. ........ 325/2; 179/175.31 R; 324/57 DE; 325/3; 325/67

[51] Int. Cl. ............................................ H04b 7/14

[58] Field of Search ................................ 325/1–3, 9, 325/10, 65, 67, 363, 472; 179/15 AL, 175.3 R, 175.31 R; 324/57 R, 57 DE

[56] References Cited

UNITED STATES PATENTS

| | | | |
|---|---|---|---|
| 3,629,696 | 12/1971 | Bartelink | 324/57 R |
| 3,777,081 | 12/1973 | Vierling | 179/175.3 R |

*Primary Examiner*—Robert L. Griffin
*Assistant Examiner*—Marc E. Bookbinder
*Attorney, Agent, or Firm*—Karl F. Ross; Herbert Dubno

[57] ABSTRACT

Several measuring stations are linked with one another by line segments enabling signal transmission thereover in a closed loop, each station including a receiving section and a transmitting section. A selector switch in the transmitting section enables establishment of a first position (I) for sending out signals originating at that section, a second position (II) for retransmitting an incoming modulating frequency ($f_3$), and a third position (III) for transmitting a replica of an incoming modulated carrier wave.

15 Claims, 4 Drawing Figures

SYSTEM FOR MEASURING GROUP DELAY AND/OR ATTENUATION IN CLOSED SIGNAL-TRANSMISSION LOOP

This is a continuation of application Ser. No. 355,492, filed Apr. 30, 1973, now abandoned.

FIELD OF THE INVENTION

My present invention relates to a system for measuring transmission characteristics such as the phase delay and/or the relative attenuation experienced by various groups of frequencies upon traveling over a predetermined transmission path, more particularly over a segment of a closed circuit encompassing a plurality of measuring stations.

BACKGROUND OF THE INVENTION

In commonly owned U.S. Pat. No. 3,414,809 (Hoffmann et al) there has been disclosed a system for measuring the group delay between a transmitter at one end and a receiver at the opposite end of a transmission line, the transmitter including two carrier-frequency oscillators which are alternately connected to the line and respectively generate a variable signal or test frequency ($f_1$) and a fixed comparison frequency ($f_2$). The two carriers are amplitude-modulated with a so-called split frequency ($f_3$) which, by use of the Nyquist principle, enables the receiver to determine the group delay with the aid of a reference frequency derived from a local oscillator on the basis of the demodulated line signal. The group delay of the transmission line (or of a network inserted in that line) is a function of the phase shift which periodically occurs in the detected envelope (of frequency $f_3$) of the line signal as the carrier alternates between the test frequency $f_1$ and the comparison frequency $f_2$. In an analogous manner, the relative group attenuation can be determined in such a system from the periodic amplitude variation of the detected split frequency $f_3$.

In such a system the tuning of the carrier oscillators and of the split-frequency generator of a measuring station, designed for transmission as well as reception, hitherto required the service of skilled personnel. Thus, if the transmission path of interest is one of several segments of a closed line loop, the monitoring of any line segment could be carried out only if the two stations at the ends of that segment were manned by such skilled personnel.

OBJECTS OF THE INVENTION

It is, therefore, the general object of my present invention to provide means in a system of this character for enabling the supervision of any outlying station on such a closed loop from a monitoring post located elsewhere along the loop.

A more particular object is to provide means for supervising, from a single monitoring post, the operation of a plurality of stations linked by one or more line segments remote from that post.

SUMMARY OF THE INVENTION

In accordance with my present invention, at least one station in a measuring system of this general type has switch means selectively settable in a basic position and in at least one alternate position to control the composition of an amplitude-modulated carrier sent out by its transmitting section. In the basic switch position, this outgoing carrier is synthesized in a modulator from locally generated high and low frequencies, specifically a pair of alternating carrier frequencies $f_1$, $f_2$ and a modulating frequency $f_3$. In an alternate switch position, the operation of the modulator is modified with the aid of control means responsive to circuitry linking the receiving and transmitting sections of that station, this circuitry obtaining from a processor in the receiving section electrical data facilitating the generation of a replica of at least one of the constituent frequencies (the carrier or the modulating signal) of an incoming amplitude-modulated carrier for retransmission to the next station as part of the outgoing carrier. The processor, whose output is also delivered to evaluation equipment such as a group-delay indicator, is designed to isolate the constituent frequencies of the incoming carrier wave and may, for this purpose, comprise a demodulator in parallel with an amplitude limiter.

There are several ways in which the control means effective in the alternate switch position (or in one of several such positions) may modify the operation of the modulator to retransmit a replica of the carrier frequency and/or the modulating frequency of an incoming oscillation. Thus, the data derived from the processor in the receiving section may be used in the transmitting section to adjust the operating frequency of a local oscillator, e.g. a carrier-frequency generator; on the other hand, a replicated constituent may be fed directly to the modulator, bypassing the corresponding local oscillator in the transmitting section.

If only the modulating signal (of frequency $f_3$) of the incoming oscillation is of interest, a replica thereof may be supplied to the modulator together with a locally generated carrier, e.g. an oscillation of comparison frequency $f_2$.

If the carrier frequency alternates between two levels $f_1$ and $f_2$, as discussed above, the replication of the modulating signal ($f_3$) is advantageously carried out with the aid of a low-frequency slave oscillator in the receiving section whose operating frequency is synchronized with the moan phase of the envelope of the incoming carrier by means of a phase discriminator, specifically a phase comparator inserted in a feedback loop of that oscillator along with a low-pass filter suppressing the modulating frequency while passing a control voltage of a polarity determined by the sign of an existing phase difference in the two comparator inputs. Such a phase comparator (or phase meter) has been described in greater detail in the above-identified Hoffmann et al patent. The output of this slave oscillator may be fed to a modulator stage of the transmitting section in lieu of the output of a low-frequency master oscillator energizing that modulator in the basic switch position.

If the local oscillators of the transmitting section are to be completely excluded during retransmission of the replicated amplitude-modulated carrier, the modulator in that section may be energized with the outputs of the amplitude limiter, of the low-frequency slave oscillator and of a storage circuit which is connected via a low-pass filter to the demodulator output to develop a signal proportional to the peak amplitude of the envelope of the incoming oscillation.

If, on the other hand, the local oscillator or oscillators are used as sources of the retransmitted carrier, the oscillator frequency may be controlled by the output of a frequency discriminator connected in tandem with the amplitude limiter. If precise synchronization between the locally generated carrier or carriers and the incoming frequency is desired, each local carrier oscillator may be provided with a phase-discriminating loop (similar to that described above with reference to the low-frequency slave oscillator) to keep its operating frequency in step with the carrier frequency in the output of the limiter. With alternating carrier frequencies $f_1$ and $f_2$, two ancillary local oscillators with similar phase loops may be connected in the output circuit of the limiter in order to generate continuous oscillations which synchronize the respective local carrier oscillators.

The low-frequency slave oscillators, aside from generating a replica of a modulating frequency $f_3$, can also be used to produce a switching frequency in step with the changeover frequency ($f_5$) between carriers $f_1$ and $f_2$. The switching frequency, derived from a step-down circuit such as a frequency divider in the output of this slave oscillator, controls one or more gating switches in the output of the demodulator and/or of the amplitude limiter for the proper timing of the control signals supplied to the modulator of the transmitting section in the alternate switch position or positions. The switching frequency may in turn be synchronized with the changeover frequency, established by a relay or equivalent switchover means at the originating station, by means of a zero-setting circuit for the frequency divider responsive to a burst of a distinct identification frequency ($f_4$) accompanying the comparison frequency $f_2$ as disclosed in the Hoffmann et al patent.

It will be apparent that a system of this nature does not require, at the outlying stations, any manual operations more complex than the switching from one position to another, and possibly the resetting of a potentiometer to modify an amplitude, which can be carried out by unskilled attendants and which could also be performed by conventional remote-control means from the monitoring post.

BRIEF DESCRIPTION OF THE DRAWING

The above and other features of my invention will now be described in detail with reference to the accompanying drawing in which.

SPECIFIC DESCRIPTION

Figures 3, 4:
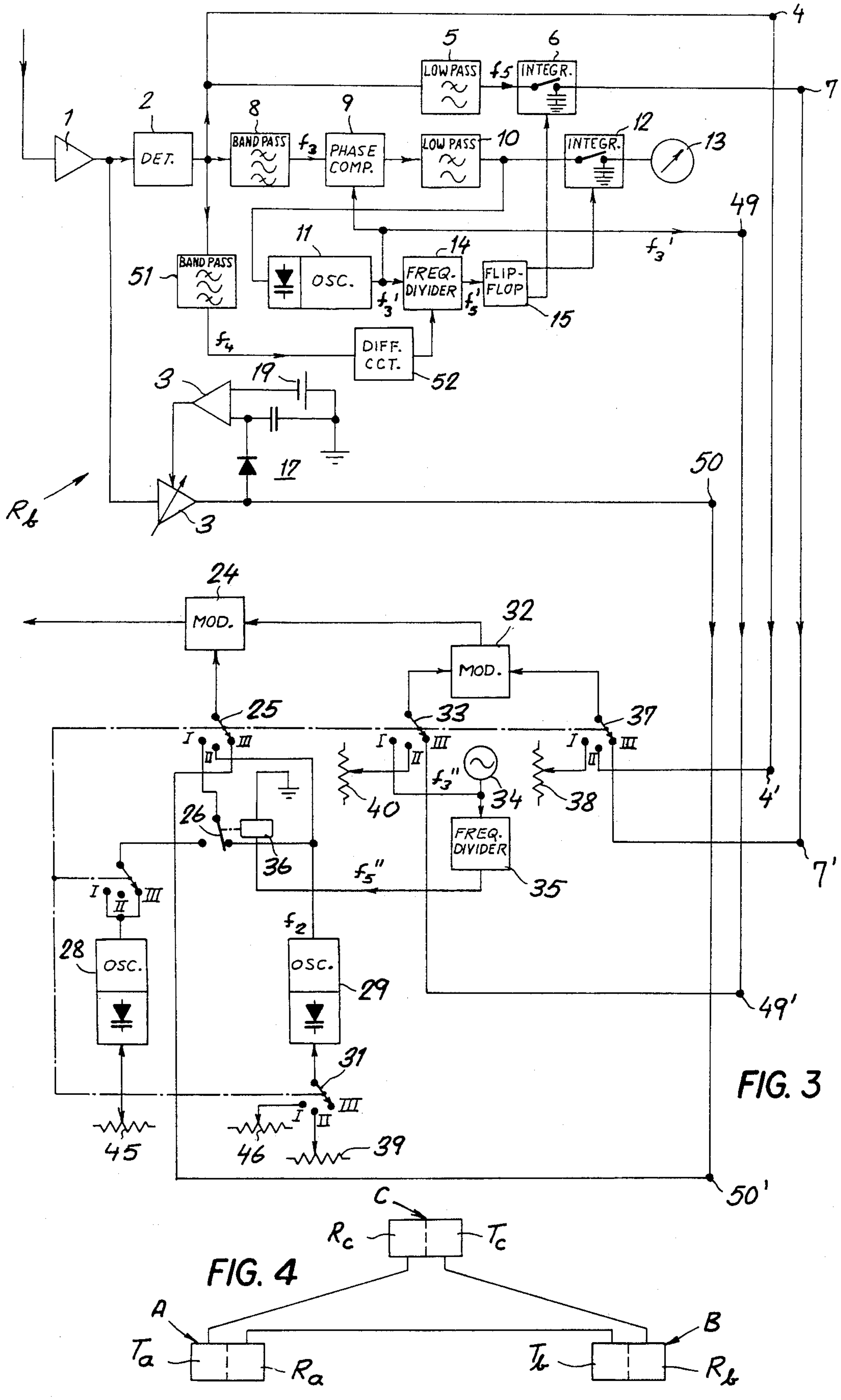
FIG. 4 is a diagram illustrating the arrangement of several such stations in a closed-circuit transmission path.

Reference will first be made to FIG. 4 showing three stations A, B and C connected in a closed line loop for signal transmission from any of these stations to any other. Each station is divided into a transmitting section $T_a$, $T_b$, $T_c$ and a receiving section $R_a$, $R_b$, $R_c$.

In the following description it will be assumed that the main station A comprises a monitoring post manned by skilled personnel, and that outlying stations B and C are served only by unskilled attendants or are provided with remote-controlled equipment for reading the instruments and carrying out switching operations, possibly including a change in the direction of transmission (e.g. from B to A instead of B to C) on command from station A.

Figure 1:
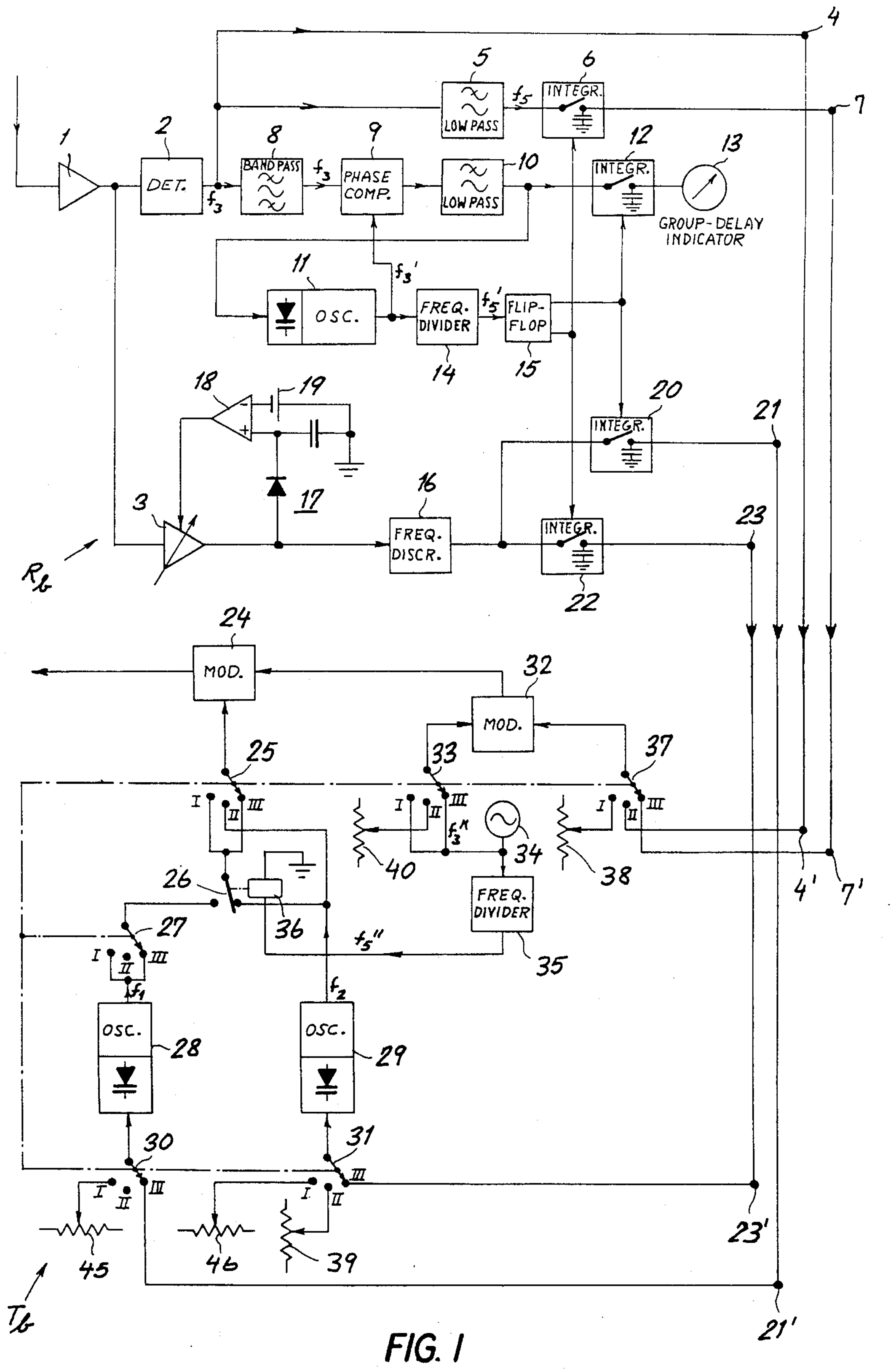
FIGS. 1, 2 and 3 show three embodiments of an outlying station in a measuring system according to my invention.

FIG. 1 shows details of the receiving section $R_b$ and the transmitting section $T_b$ of station B, these sections being also representative of corresponding sections of stations A and C. Receiving section $R_b$ comprises an input amplifier 1 feeding a detector or amplitude demodulator 2 and, in parallel therewith, a limiting amplifier 3 producing an output of constant amplitude. For this purpose, amplifier 3 works into a peak-rectifying network 17 feeding one input of a differential amplifier 18 whose other input receives a constant voltage from a battery 19; amplifier 18 feeds back to a control input of variable-gain amplifier 3 a voltage of a sign and magnitude corresponding to the difference, if any, between the voltage peaks in the output of amplifier 3 and the reference voltage of battery 19, this control voltage tending to reduce that difference to zero.

Detector 2, whose output is a low-frequency modulating voltage $f_3$ (e.g. of 40 Hz.), supplies that modulating frequency in parallel to a terminal 4, a low-pass filter 5 and a band-pass filter 8. Filter 5 suppresses the frequency $f_3$ but gives passage to a switching frequency $f_5$ whose amplitude is stored in an integrating stage 6 comprising a capacitor in series with an electronic gating switch; the output of integrator 6 energizes a terminal 7. The narrow-band filter 8 passes the modulating frequency $f_3$ and supplies it to a phase comparator 9 receiving a reference frequency $f_3'$ from an electronically tunable low-frequency slave oscillator 11 whose tank circuit includes a varactor controlled by the output of a low-pass filter 10, also blocking the frequency $f_3$, in series with phase comparator 9. Frequency $f_3'$, synchronized by this feedback loop with the mean phase of detected frequency $f_3$, is also supplied to a frequency divider 14 (preferably of the binary type) stepping it down to a switching frequency $f_5'$ (e.g. of a few Hz.) periodically reversing a flip-flop 15. An integrator 12, similar to integrator 6, is inserted between filter 10 and a group-delay indicator 13 whose output may be read directly by an attendant or reported back to the monitoring post in station A (FIG. 4). The electronic gating switches of integrators 6 and 12 are alternately closed by the flip-flop 15, in parallel with those of two further integrators 22 and 20 respectively inserted between a frequency discriminator 16 and two terminals 21, 23. Frequency discriminator 16 receives the output of limiting amplifier 3 alternating between frequencies $f_1$ and $f_2$; the timing of flip-flop 15 is such that the integrators 12 and 20 are activated in the presence of test frequency $f_1$ and the integrators 6 and 22 are activated in the presence of comparison frequency $f_2$. The amplitude of the oscillation of frequency $f_5$ (which normally equals frequency $f_5'$) is a measure of the relative group attenuation of the line under test and may be indicated by a nonillustrated instrument connected to the output of filter 5 by way of an integrator, not shown, operating in the presence of carrier $f_1$ (i.e. in step with integrators 12 and 20).

Transmitting section $T_b$ has four input terminals 4', 7', 21' and 23' respectively connected, via nonillustrated amplifiers if necessary, to output terminals 4, 7, 21 and 23 of receiving section $R_b$. A three-position switch with six levels 25, 27, 30, 31, 33 and 37 has a basic position I in which station B receives signals from station C and transmits signals to station A, or vice versa, in the manner disclosed in the above-identified Hoffmann et al patent; terminals 4', 7', 21' and 23' are then open-circuited. In position I, furthermore, an armature 26 of a relay 36 (which could also be an electronic switch) alternately connects two tunable local oscillators 28 and 29 via switch level 25 to one input of a modulator or mixer stage 24 working via nonillustrated amplifiers, filters and level controls into an outgoing line; the other input of this modulator is connected to an output of a further modulator stage 32 receiving on its right-hand input a constant biasing voltage via switch level 37 from a potentiometer 38 (connected across a nonillustrated source of d-c voltage) and further receiving on its left-hand input, via switch level 33, a modulating or split frequency $f_3''$ from a low-frequency master oscillator 34. The output of oscillator 34 is stepped down in a frequency divider 35, similar to divider 14, to a switching frequency $f_5''$ (normally equal to frequency $f_5$) which periodically reverses the relay 36 to deliver either the frequency $f_1$ (via switch levels 25 and 27) or the freq uency $f_2$ (via switch level 25) to modulator stage 24. The operating frequencies of oscillators 28 and 29 are determined by two potentiometers 45, 46 connected to their control inputs via switch levels 30 and 31, respectively. Units 24, 28, 29, 32 and 34 are part of a wave synthesizer generating the outgoing carrier.

In switch position ("retransmission") II, the periodic operation of relay 36 is ineffectual since switchlevel 25 permanently connects the oscillator 29 to modulator stage 24. Modulator stage 32 receives on its left-hand input a constant biasing voltage via switch level 33 from a potentiometer 40 whereas its right-hand input is connected by switch level 37 to terminal 4' carrying the split frequency $f_3$ as detected by demodulator 2. Thus, the monitoring post at station A receives a replica of the modulating signal as generated by oscillator 34 at station C in its switch position I, or as generated by the corresponding oscillator at station A and retransmitted by station C in its switch position II. This enables the operator at station A to detect the adjustment of the level of this modulating signal at any station. The operating frequency of oscillator 29 is determined at this stage by a potentiometer 39 connected to its control input via switch level 31.

Switch position III ("remote adjustment") differs from switch position I in that the right-hand input of modulator stage 32 is not connected via switch level 37 to terminal 7', carrying a stored signal derived from changeover frequency $f_5$, whereas the control inputs of oscillators 28 and 29 are tied by way of switch levels 30 and 31 to terminals 21' and 23', respectively. These oscillators are therefore tuned to their frequencies $f_1$ and $f_2$ with the aid of the voltages stored in integrators 20 and 22, respectively, as obtained from discriminator 16 upon the reception of the corresponding carriers from station C. Since the voltage on terminal 7' is proportional to the peak amplitude of the received envelope of frequency $f_3$, modulator stage 24 now produces an amplitude-modulated signal wave conforming in both its carrier and modulating frequencies as well as in the depth of its modulation to the oscillation arriving at amplifier 1. If station A is in switch position I and the other two stations are in alternate switch position III, the output frequencies $f_1, f_2$ of their local oscillators 28, 29 will thereby become stabilized at values close to one another, within the limits of correlation of the frequency/voltage relationships in the frequency discriminator 16 and in the several varactor-controlled tank circuits. Test frequency $f_1$ need not be constant but may be periodically varied or wobbled, as described in the patent to Hoffmann et al, e.g. by adjusting the potentiometer 45 of station A.

Figure 2:
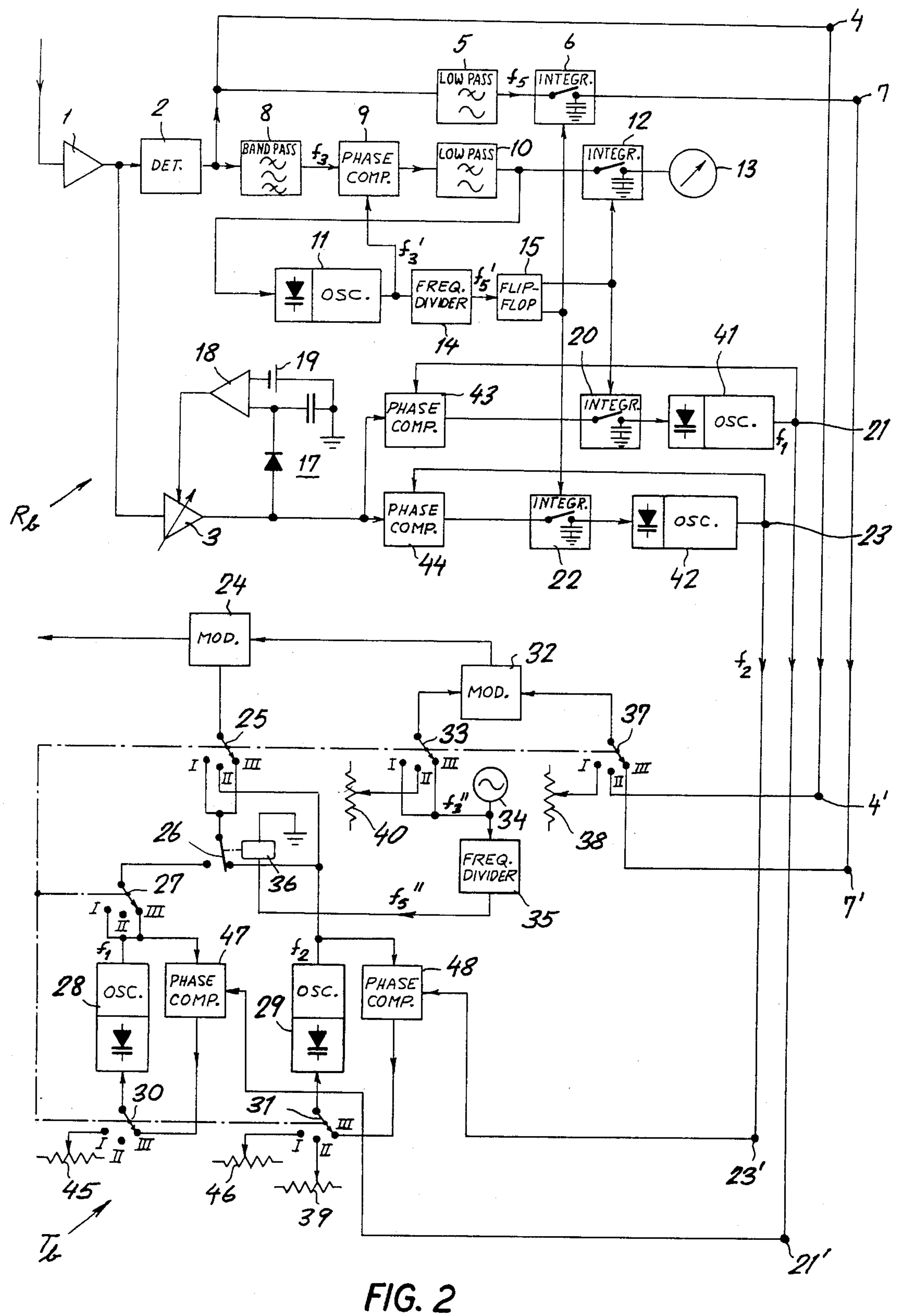

In FIG. 2 I have shown a modification of receiving and transmitting sections $R_b$, $T_b$ facilitating a precise tuning of these oscillators so as to make each carrier frequency $f_1, f_2$ identical throughout all or part of the loop. The frequency discriminator 16 in section $R_b$ has here been replaced by a pair of phase comparators 43, 44 connected in parallel in the output of limiting amplifier 3, ahead of integrators 20 and 22. Two ancillary oscillators 41 and 42 are inserted between integrators 20, 22 and terminals 21, 23, respectively; a feedback circuit extends from each of these terminals to a second input of the associated phase comparator whereby the oscillators 41 and 42 are tuned to the alternately arriving carrier frequencies $f_1$ and $f_2$ under the control of voltages stored in the two integrators 20, 22. Oscillators 28 and 29 in section $T_b$ are here also provided with phase-responsive feedback loops including respective phase comparators 47, 48 each receiving on the one hand the output of the associated carrier oscillator 28, 29 and on the other hand, via terminals 21', 23', the output of the respective ancillary oscillator 41, 42. Thus, oscillators 28 and 29 will reproduce, like oscillators 41 and 42, the incoming carrier frequencies $f_1$ and $f_2$, thereby allowing the line segment B — A (or possibly B — C) to be explored with frequencies selected at station A.

FIG. 3 illustrates a further modification enabling the direct but separate transmission of the incoming carrier frequencies $f_1$, $f_2$ — with constant amplitude — and the modulating frequency $f_3$ from section $R_b$ to section $T_b$ for recombination in modulator stage 24. For this purpose, the output of the low-frequency slave oscillator 11 is delivered not only to components 9 and 14 but also to a terminal 49 whose companion terminal 49' in section $T_b$ is tied to the third bank contact of switch level 33 for connection to modulator stage 32 in switch position III. Limiting amplifier 3 works directly into a terminal 50 whose companion terminal 50' is tied to the third bank contact of switch level 25 for connection to modulator stage 24 in switch position III. The operation of the system of FIG. 3 in switch positions I and II is the same as in the preceding embodiments, but in switch position III the master oscillators 28, 29 and 34 are disconnected from modulator stages 24 and 32. Again, therefore, a desired amplitude-modulated carrier can be selected at main station A for transmission around all or part of the loop.

In FIG. 3 I have also illustrated a band-pass filter 51 selecting from the output of detector 2 an identification frequency $f_4$, e.g. of 160 Hz., and feeding it to a differentiator 52 for generating a zero-setting pulse for frequency divider 14 to synchronize the reconstituted switching frequency $f_5'$ with the changeover frequency $f_5$ of the incoming signal; as more fully described in the above-identified Hoffmann et al U.S. Pat. No. 3,414,809, this identification frequency may be generated during a small fraction of that half-cycle of frequency $f_5$ in which the comparison frequency $f_2$ is transmitted over the line. This synchronization circuit can, of course, also be used in the systems of FIGS. 1 and 2.

It will be apparent that the replicated modulating frequency $f_3$ from terminal 49' (FIG. 3) could also be combined in the input of modulator 24 with the controlled carrier frequencies from oscillators 28 and 29 in switch position III of FIG. 1 or 2.

I claim:

1. A system for sending amplitude-modulated carrier waves over transmission paths linking a plurality of measuring stations in a closed loop, said stations serving to determine the characteristics of said transmission paths, comprising:
- a receiving section and a transmitting section at each measuring station;
- a wave synthesizer in said transmitting section including oscillation-generating means for producing separate high-frequency carrier oscillations and low-frequency modulating oscillations, said wave synthesizer further including modulating means for combining said oscillations into an outgoing amplitude-modulated carrier wave;
- processing means in said receiving section for isolating a carrier component and a modulating component of an incoming amplitude-modulated carrier wave, said processing means including output circuitry producing signal voltages derived from at least one of said components;
- evaluation means in said receiving section connected to said output circuitry for translating a signal voltage thereof into an indication of a transmission characteristic of a transmission path terminating at said receiving station;
- switch means in at least one of said measuring stations selectively settable in a basic position and at least one alternate position; and
- conductor means in said one of said measuring stations connected to said output circuitry of the receiving section thereof for energization by at least some of said signal voltages, said conductor means being connected in said alternate position of said switch means to said wave synthesizer of the associated transmitting section for modifying the operation thereof to replicate a parameter of a component of said incoming carrier wave in a corresponding constituent of said outgoing carrier wave, said wave synthesizer being disconnected from said conductor means in said basic position of said switch means.

2. A system as defined in claim 1 wherein said processing means includes a demodulator for detecting the envelope of said incoming carrier wave, said demodulator being connected to said conductor means through said output circuitry.

3. A system as defined in claim 1 wherein said processing means includes a limiter for deriving from said incoming carrier wave a constant-amplitude oscillation of said carrier frequency, said limiter being connected to said conductor means through said output circuitry.

4. A system as defined in claim 3 wherein said limiter includes a variable-gain amplifier provided with a feedback circuit and a differential amplifier in said feedback circuit having an input connected to a source of constant reference voltage.

5. A system as defined in claim 3 wherein said oscillation-generating means includes a variable oscillator provided with tuning means connected to said conductor means in said alternate position of said switch means for conforming the operating frequency of said variable oscillator to the output frequency of said limiter.

6. A system as defined in claim 5 wherein said output circuitry includes a frequency discriminator inserted between said limiter and said conductor means.

7. A system as defined in claim 5 wherein said wave synthesizer includes phase-comparison means connected to said variable oscillator and to said conductor means for synchronizing the operating frequency of said variable oscillator with the carrier frequency of said constant-amplitude oscillation received from said limiter by way of said conductor means.

8. A system as defined in claim 1 wherein said transmitting section includes switchover means for periodically altering the frequency of said carrier oscillations; said processing means including a demodulator for detecting the envelope of said incoming carrier wave, said envelope varying periodically in phase with the frequency of said incoming carrier wave, a low-frequency slave oscillator, and phase-comparison means connected to said slave oscillator and to said demodulator for synchronizing the operating frequency of said slave oscillator with a mean phase of said envelope; said evaluation means including an output connection from said slave oscillator.

9. A system as defined in claim 8 wherein said processing means further includes a limiter for deriving from said incoming carrier wave a constant-amplitude oscillation of periodically varying frequency, said limiter being connected through said output circuitry to said conductor means.

10. A system as defined in claim 9 wherein said output circuitry has a plurality of branch circuits with terminals connected on the one hand to said evaluation means and on the other hand to said conductor means, said processing means further including frequency-reducing means connected to said slave oscillator for deriving therefrom a switching frequency in step with the changeover of said incoming carrier wave and gating means connected to said frequency-reducing means for alternately closing certain of said branch circuits in the rhythm of said switching frequency.

11. A system as defined in claim 10 wherein said oscillation-generating means comprises two carrier oscillators of different frequencies alternately connectable by switchover means to said modulating means, said wave synthesizer including separate control circuits for varying the operating frequencies of said carrier oscillators, said conductor means including two conductors alternately energizable by said gating means for respectively energizing said control circuits with signal voltages derived from the output of said limiter.

12. A system as defined in claim 11 wherein said output circuitry includes two ancillary oscillators each connected to a respective one of said conductors and first phase-comparison means connected to said limiter and to each ancillary oscillator for synchronizing the operating frequency thereof with a respective carrier frequency in the output of said limiter, each of said control circuits including second phase-comparison means connected to said conduction means and to its respective carrier oscillator for synchronizing the operating frequency thereof with that of the respective ancillary oscillator.

13. A system as defined in claim 10 wherein said output circuitry includes a low-pass filter in the output of said demodulator and storage means connected to said filter in series with said gating means for delivering to said conductor means a signal proportional to the peak amplitude of said envelope.

14. A system as defined in claim 13 wherein said oscillation-generating means includes a low-frequency master oscillator, said modulating means being directly connected by said conductor means to said storage means, said slave oscillator and said limiter in said alternate position of said switch means while being disconnected from said carrier oscillators and said master oscillator.

15. A system as defined in claim 10 wherein said frequency reducing means comprises a frequency divider, further including zero-setting means for said frequency divider responsive to a burst of a distinct identification frequency modulating said incoming carrier wave.

* * * * *